(12) United States Patent
Gao et al.

(10) Patent No.: US 11,651,591 B2
(45) Date of Patent: May 16, 2023

(54) VIDEO TIMING LABELING METHOD, ELECTRONIC DEVICE AND STORAGE MEDIUM

(71) Applicant: BEIJING DAJIA INTERNET INFORMATION TECHNOLOGY CO., LTD., Beijing (CN)

(72) Inventors: Yanjun Gao, Beijing (CN); Xin Chen, Beijing (CN); Huayan Wang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/842,654

(22) Filed: Jun. 16, 2022

(65) Prior Publication Data

US 2022/0327827 A1    Oct. 13, 2022

Related U.S. Application Data

(63) Continuation of application No. PCT/CN2021/114059, filed on Aug. 23, 2021.

(30) Foreign Application Priority Data

Dec. 22, 2020 (CN) .......................... 202011526967.5

(51) Int. Cl.
*G06V 20/40* (2022.01)
*G06F 16/783* (2019.01)

(52) U.S. Cl.
CPC .......... *G06V 20/41* (2022.01); *G06F 16/7844* (2019.01); *G06V 20/49* (2022.01)

(58) Field of Classification Search
CPC ..... G06V 20/41; G06V 20/49; G06F 16/7844
See application file for complete search history.

(56) References Cited

U.S. PATENT DOCUMENTS 9,129,158 B1    9/2015 Medasani et al.
9,807,291 B1 *  10/2017 Tome ................. H04N 1/00204
(Continued)

FOREIGN PATENT DOCUMENTS

CN    105677735 A    6/2016
CN    109905772 A    6/2019
(Continued)

OTHER PUBLICATIONS

International search report of PCT application No. PCT/CN2021/114059 dated Nov. 2, 2021.
(Continued)

*Primary Examiner* — Santiago Garcia
(74) *Attorney, Agent, or Firm* — Knobbe, Martens, Olson & Bear, LLP

(57) ABSTRACT

The present disclosure provides a video timing labeling method. The method includes: acquiring a video file to be labeled and text information to be inquired; acquiring a video segment matching the text information to be inquired based on a timing labeling network of a timing labeling model; acquiring a video feature of the video segment matching the text information to be inquired based on a feature extraction network of the timing labeling model; acquiring text information corresponding to the video segment labeled in the video file based on a visual text translation network of the timing labeling model; and outputting the video segment matching the text information to be inquired and the text information corresponding to the video segment labeled in the video file based on the timing labeling model.

20 Claims, 8 Drawing Sheets

(56) References Cited

U.S. PATENT DOCUMENTS

| | | | |
|---|---|---|---|
| 10,229,719 B1* | 3/2019 | Matias | G11B 27/28 |
| 10,642,892 B2 | 5/2020 | Xiao et al. | |
| 11,128,832 B1* | 9/2021 | Klein | H04N 7/0117 |
| 2003/0076413 A1* | 4/2003 | Kanade | H04N 5/2627 |
| | | | 348/139 |
| 2007/0106685 A1* | 5/2007 | Houh | G06F 16/43 |
| | | | 707/999.102 |
| 2008/0193129 A1* | 8/2008 | Morita | H04N 7/22 |
| | | | 398/59 |
| 2011/0258188 A1 | 10/2011 | Abdalmageed et al. | |
| 2012/0207207 A1* | 8/2012 | Peer | H04N 19/597 |
| | | | 375/E7.026 |
| 2013/0195377 A1* | 8/2013 | Muninder | G06V 10/25 |
| | | | 382/294 |
| 2013/0322537 A1* | 12/2013 | Rossato | H04N 19/126 |
| | | | 375/240.16 |
| 2015/0050006 A1* | 2/2015 | Sipe | G06F 16/7837 |
| | | | 386/241 |
| 2017/0150236 A1* | 5/2017 | Newman | H04N 5/247 |
| 2017/0300150 A1 | 10/2017 | Choe et al. | |
| 2019/0289359 A1* | 9/2019 | Sekar | H04N 21/4333 |
| 2022/0294727 A1* | 9/2022 | Azzam | H04L 43/106 |

FOREIGN PATENT DOCUMENTS

| | | |
|---|---|---|
| CN | 110321958 A | 10/2019 |
| CN | 110751224 A | 2/2020 |
| CN | 111914644 A | 11/2020 |
| CN | 111950393 A | 11/2020 |
| CN | 112261491 A | 1/2021 |
| WO | 2018040059 A1 | 3/2018 |
| WO | 2018127627 A1 | 7/2018 |

OTHER PUBLICATIONS

First office action of Chinese application No. 202011526967.5 dated Feb. 2, 2021.

Second office action of Chinese application No. 202011526967.5 dated Feb. 24, 2021.

Mun Jonghwan et al., "Local-Global Video-Text Interactions for Temporal Grounding", Proceedings of the 2020 IEEE/CVF Conference on Computer Vision and Pattern Recognition (CVPR).

Notification to Grant Patent Right for Invention of Chinese application No. 202011526967.5 dated Mar. 5, 2021.

* cited by examiner

VIDEO TIMING LABELING METHOD, ELECTRONIC DEVICE AND STORAGE MEDIUM

CROSS-REFERENCE TO RELATED APPLICATION

This application is a continuation application of International Application No. PCT/CN2021/114059, filed on Aug. 23, 2021 which claims the benefit of priority to Chinese Application No. 202011526967.5, filed on Dec. 22, 2020, both of which are incorporated by reference herein.

TECHNICAL FIELD

The present disclosure relates to the field of machine learning technologies, and in particular to a video timing labeling method and an electronic device.

BACKGROUND

Video timing labeling is an important process in tasks such as video processing and pattern recognition. Video timing labeling refers to the prediction of start time and end time matching text information from a video file by recognizing the video file, and the labeling of a video segment matching the text information in the video file based on the start time and end time.

SUMMARY

According to one aspect of embodiments of the present disclosure, a video timing labeling method is provided. The method includes: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

According to another aspect of the embodiments of the present disclosure, a video timing labeling apparatus is provided. The video timing labeling apparatus includes: an acquiring unit, configured to acquire a video file to be labeled and text information to be inquired; a timing labeling unit, configured to acquire a video segment matching the text information to be inquired by inputting the video file and the text information to be inquired into a timing labeling network of a timing labeling model; a feature extracting unit, configured to acquire a video feature of the video segment matching the text information to be inquired by inputting the video segment matching the text information to be inquired into a feature extraction network of the timing labeling model; a visual text translating unit, configured to acquire text information corresponding to the video segment labeled in the video file by inputting the video feature of the video segment matching the text information to be inquired into a visual text translation network of the timing labeling model; and an outputting unit, configured to output the video segment matching the text information to be inquired and the text information corresponding to the video segment labeled in the video file based on the timing labeling model.

According to another aspect of the embodiments of the present disclosure, an electronic device is provided. The electronic device includes: one or more processors; and a memory configured to store one or more instructions executable by the one or more processors; wherein the one or more processors, when loading and executing the one or more instructions, are caused to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

According to another aspect of the embodiments of the present disclosure, a non-transitory computer-readable storage medium storing one or more instructions therein is provided. The one or more instructions, when loaded and executed by a processor of an electronic device, cause the electronic device to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

According to another aspect of the embodiments of the present disclosure, a computer program product comprising one or more computer instructions is provided. The one or more computer instructions, when loaded and executed by a processor, cause the processor to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

The timing labeling model according to the embodiments of the present disclosure includes the timing labeling network, the feature extraction network, and the visual text translation network. In the process of processing the video file, the video segment matching the text information to be inquired in the video file can be recognized based on the timing labeling network. The text information corresponding to the video segment labeled in the video file is translated based on the visual text translation network. Therefore, the video segment matching the text information to be inquired and the text information corresponding to the video segment labeled in the video file can be output by the timing labeling model. That is, various output results of the video file are acquired based on one timing labeling model, thereby improving the diversity of a video labeling result.

DETAILED DESCRIPTION

Figure 1:
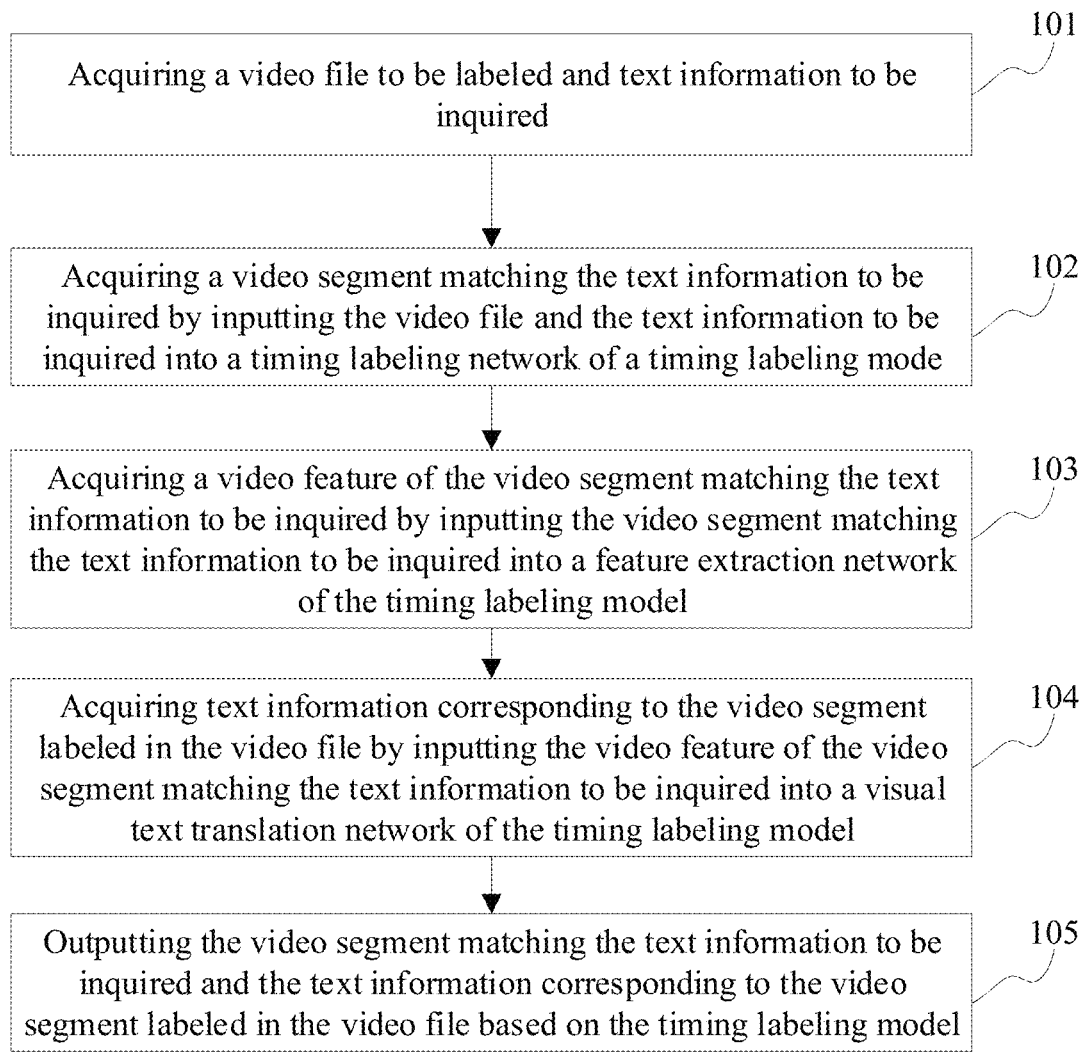
FIG. 1 is a flowchart of a video timing labeling method according to some embodiments.

With the development of machine learning technologies, the application scenarios of video timing labeling are more and more extensive. For example, the video timing labeling is used in scenarios, such as video processing and pattern recognition. In some embodiments, an original video file is edited through the video timing labeling to acquire a video segment matching the text information to be queried. For example, in the process of editing the video, an electronic device receives the text information to be queried input by a user, recognizes a video content in the video file based on the text information to be queried, and edits the recognized video segment to acquire the well edited video segment. In other embodiments, the original video file is recognized through the video timing labeling to acquire a video file matching the text information to be queried. For example, during video search, the electronic device receives the text information to be queried input by the user, searches multiple video files based on the text information to be queried, acquires the video file containing a video segment matching the text information to be queried, and feeds the video file back.

In the related art, when the video timing labeling is performed, a timing labeling model only has the function of timing labeling. Therefore, only a single video labeling result, that is, the video segment, can be acquired when the video timing labeling is performed through the timing labeling model.

Correspondingly, before video processing is performed on the video file, it is necessary to perform model training on the timing labeling model to be trained to acquire a trained timing labeling model. In the related art, when model training is performed on the timing labeling model, a video sample is input into the timing labeling model to be trained, and a parameter of the timing labeling model is adjusted based on a timing labeling loss parameter generated by the timing labeling model, until the model training is completed, and the timing labeling model is acquired. In the process of model training, since only the timing labeling loss parameter is used as the standard to measure whether the training of the timing labeling model is completed, a training index for model training is relatively single. In the case of problems such as inaccurate feature extraction and the like in the training process, the matching degree between a text feature and a video feature of the video file has an error, resulting in an inaccurate timing labeling model acquired by training.

In the embodiment of the present disclosure, a timing labeling network, a feature extraction network and a visual text translation network are combined in the timing labeling model. A video segment matching the text information to be inquired in the video file can be determined by the timing labeling network, feature extraction is performed on the video segment matching the text information to be inquired by the feature extraction network, and visual text translation is performed on an extracted video feature by the visual text translation network, to acquire text information corresponding to the video segment labeled in the video file, such that in the process of labeling the video file, the labeled video segment and the text information corresponding to the video segment can be acquired. Therefore, various output results of the video file can be acquired by one timing labeling model, thereby improving the diversity of a video labeling result.

In addition, in the process of training the timing labeling model, the timing labeling network, the feature extraction network and the visual text translation network in the timing labeling model are jointly trained, which enriches training parameters of training the timing labeling model, and further improves the accuracy during video timing labeling of the timing labeling model.

FIG. 1 is a flowchart of a video timing labeling method according to some embodiments. As shown in FIG. 1, an execution subject of the method is an electronic device, and the method includes the following steps.

In step 101, a video file to be labeled and text information to be inquired are acquired.

In step 102, a video segment matching the text information to be inquired is acquired by inputting the video file and the text information to be inquired into a timing labeling network of a timing labeling model.

In step 103, a video feature of the video segment matching the text information to be inquired is acquired by inputting the video segment matching the text information to be inquired into a feature extraction network of the timing labeling model.

In step 104, text information corresponding to the video segment labeled in the video file is acquired by inputting the video feature of the video segment matching the text information to be inquired into a visual text translation network of the timing labeling model.

In step 105, the video segment matching the text information to be inquired and the text information corresponding to the video segment labeled in the video file are output based on the timing labeling model.

In some embodiments, the acquiring the video segment matching the text information to be inquired by inputting the video file and the text information to be inquired into the timing labeling network of the timing labeling model includes:

acquiring a video feature of the video file and a text feature of the text information to be inquired by performing feature extraction on the video file and the text information to be inquired based on the timing labeling network of the timing labeling model;

determining, from the video feature of the video file, a video feature matching the text feature of the text information to be inquired; and determining a video segment corresponding to the video feature matching the text feature of the text information to be inquired as the video segment matching the text information to be inquired.

In some embodiments, the timing labeling model is obtained by:

determining a timing labeling model to be trained, wherein the timing labeling model to be trained comprises a timing labeling network to be trained, a feature extraction network to be trained, and a visual text translation network to be trained;

acquiring a video segment labeled by the timing labeling network to be trained by inputting a video sample into the timing labeling network to be trained;

determining a timing labeling loss parameter of the timing labeling network to be trained based on the video segment labeled by the timing labeling network to be trained and a video segment labeled in the video sample;

determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample;

determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

In some embodiments, the determining the timing labeling loss parameter of the timing labeling network to be trained based on the video segment labeled by the timing labeling network to be trained and the video segment labeled in the video sample includes:

determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

In some embodiments, the determining the first similarity parameter and the video feature of the video segment labeled by the timing labeling network to be trained based on the video segment labeled by the timing labeling network to be trained and the text information labeled in the video sample includes:

acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

In some embodiments, the determining the translation quality parameter of the visual text translation network to be trained based on the video feature of the video segment labeled by the timing labeling network to be trained and the text information labeled in the video sample includes:

acquiring text information corresponding to the video sample by inputting the video feature of the video segment labeled by the timing labeling network to be trained into the visual text translation network to be trained;

determining a second similarity parameter between the text information corresponding to the video sample and the text information labeled in the video sample; and determining the second similarity parameter as the translation quality parameter.

In some embodiments, the adjusting the parameter of the timing labeling model to be trained based on the timing labeling loss parameter, the first similarity parameter, and the translation quality parameter to acquire the timing labeling model includes:

adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

The embodiments of the present disclosure provide a new timing labeling model, and the timing labeling model includes the timing labeling network, the feature extraction network, and the visual text translation network. In the process of processing the video file, the video segment matching the text information to be inquired in the video file can be recognized based on the timing labeling network. The text information corresponding to the video segment labeled in the video file is translated based on the visual text translation network. Therefore, the video segment matching the text information to be inquired and the text information corresponding to the video segment labeled in the video file can be output by the timing labeling model. That is, various output results of the video file are acquired based on one timing labeling model, thereby improving the diversity of a video labeling result.

Figure 2:
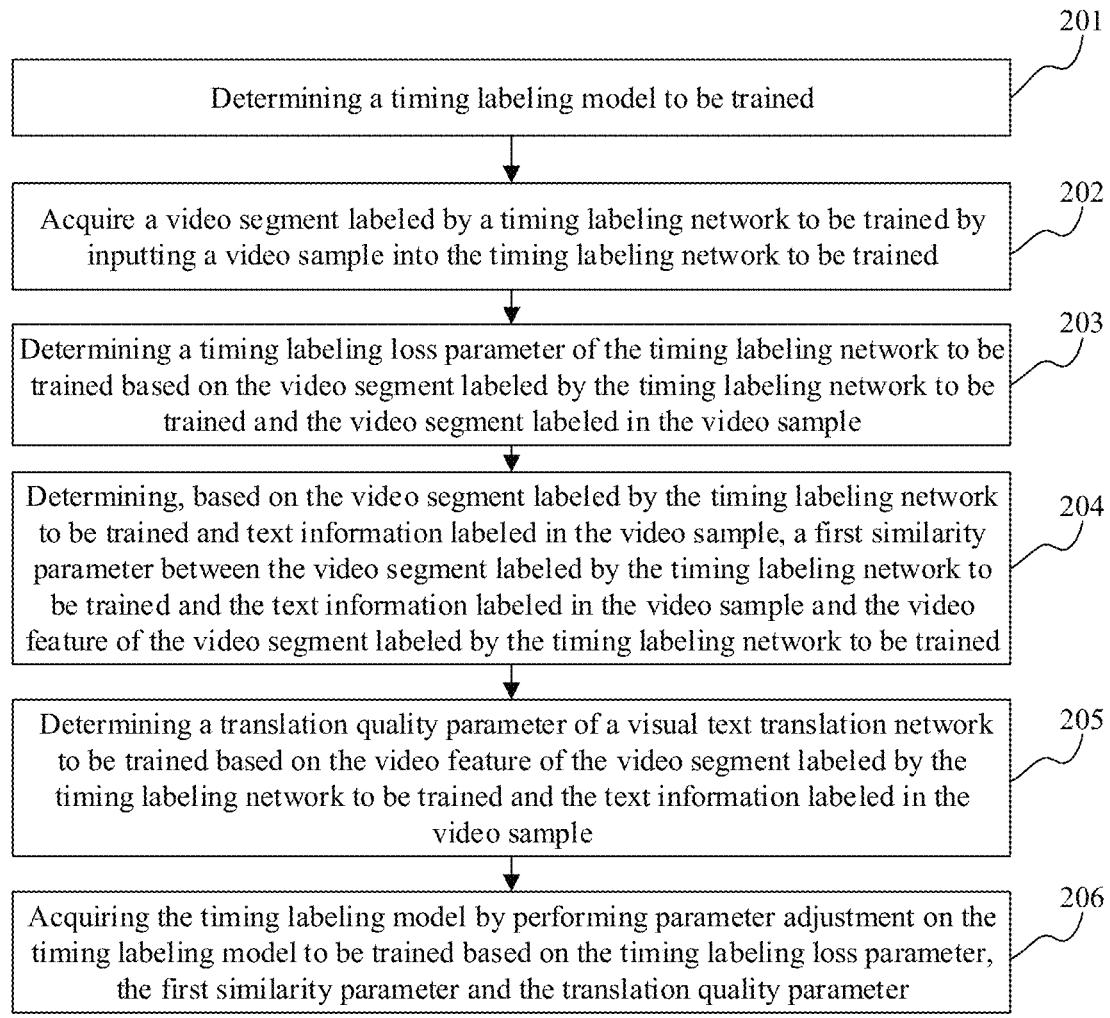
FIG. 2 is a flowchart of a method for training timing labeling models according to some embodiments.

Before the video file to be labeled is labeled based on the timing labeling model, the timing labeling model to be trained needs to be subjected to model training to acquire the timing labeling model. FIG. 2 is a flowchart of a method for training timing labeling models according to some embodiments. In the embodiments of the present disclosure, the model training of the timing labeling model to be trained is taken as an example for description. As shown in FIG. 2, the execution subject of the method is an electronic device, and the method includes the following steps.

In step 201, a timing labeling model to be trained is determined.

The timing labeling model to be trained includes a timing labeling network to be trained, a feature extraction network to be trained and a visual text translation network to be trained.

In this step, the structure of the timing labeling model is determined. For example, a network structure of the timing labeling network, a network structure of the feature extraction network and a network structure of the visual text translation network are determined, and a connection structure among the timing labeling network, the feature extraction network and the visual text translation network is determined.

Figure 3:
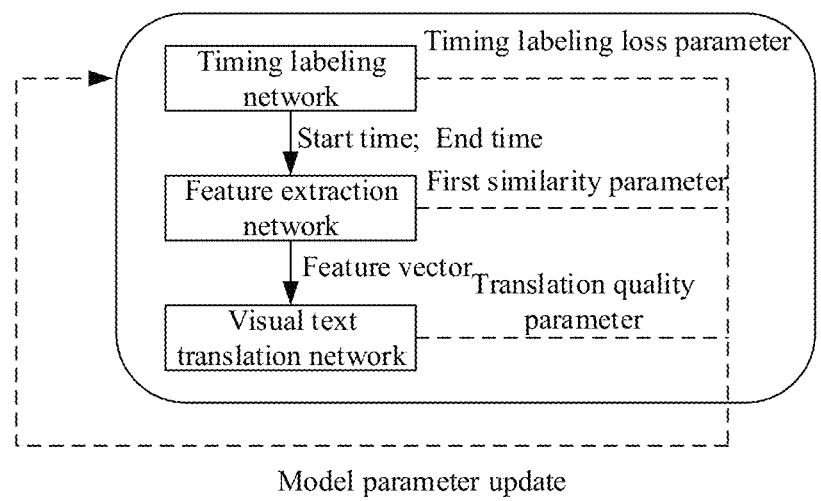
FIG. 3 is a flowchart of a video timing labeling method according to some embodiments.

In some embodiments, the timing labeling model is an assembly line-type model training architecture; that is, the timing labeling network, the feature extraction network, and the visual text translation network are constructed into an assembly line-type model training architecture. Referring to FIG. 3, an output of the timing labeling network is used as an input of the feature extraction network, and an output of the feature extraction network is used as an input of the visual text translation network. Therefore, after the timing labeling network acquires an output result, the output result can be directly input into the feature extraction network, and after the feature extraction network acquires the output result, the output result can be directly input into the visual text translation network.

In the embodiment of the present disclosure, the timing labeling network, the feature extraction network and the visual text translation network in the timing labeling model are constructed as an assembly line-type model training architecture, such that the output of the former network can be directly used as the input of the latter network. Therefore, the timing labeling network, the feature extraction network and the visual text translation network can be trained synchronously, which simplifies the process of model training and improves the accuracy of model training.

It should be noted that the timing labeling network, the feature extraction network and the visual text translation network are networks of any structure designed by developers. In the embodiment of the present disclosure, the structures of the timing labeling network, the feature extraction network and the visual text translation network are not specifically limited.

In step 202, a video segment labeled by the timing labeling network to be trained is acquired by inputting a video sample into the timing labeling network to be trained.

The video sample is a video sample with a labeled video segment, and the video sample is also labeled with text information matching the video segment; the video segment labeled in the video sample matches the text information labeled in the video sample. The video segment labeled in the video sample is a sample video segment for training the timing labeling model by a user, and the text information labeled in the video sample is sample text information for training the timing labeling model. In some embodiments, the start time and the end time are labeled in the video sample, and the video segment between the start time and the end time is the video segment labeled in the video sample. It should be noted that the text information labeled in the video sample is a word, a keyword, a description text, an image, a video file, and the like. In the embodiment of the present disclosure, the text information labeled in the video sample is not limited.

In this step, the video sample is input into the timing labeling network, the video sample is labeled based on the timing labeling network to acquire the video segment predicted by the timing labeling network, and the video segment predicted by the timing labeling network matches the text information labeled in the video sample.

In this step, based on the timing labeling network, a video feature of the video sample is extracted, and the extracted video feature is compared with a text feature of the labeled text information to acquire the predicted video segment. The process includes the following steps (1) to (3).

(1) Based on the timing labeling network, feature extraction is performed on the video sample and the text information labeled in the video sample separately, to acquire the video feature of the video sample and the text feature of the text information labeled in the video sample.

The video feature of the video sample and the text feature of the text information labeled in the video sample are features of any type. For example, the video feature of the video sample and the text feature of the text information labeled in the video sample are both vector features or matrix features, etc.

(2) A video feature matching the text feature of the text information labeled in the video sample is determined from the video feature of the video sample.

In this step, the text feature of the text information labeled in the video sample and the video feature of the video sample are compared one by one, to acquire the video feature matching the text feature of the text information labeled in the video sample. The matching of the text feature and the video feature refers to that the text feature and the video feature are the same or similar.

In some embodiments, a similarity between the text feature of the text information labeled in the video sample and the video feature of the video sample is determined, and the video feature with the highest similarity is determined as the video feature matching the text feature of the text information labeled in the video sample. The similarity between the text feature of the text information labeled in the video sample and the video feature of the video sample is the similarity of any type. For example, the similarity is a cosine similarity or the like.

In some embodiments, the video sample is divided into a plurality of video segments, each video segment has a corresponding video feature, the similarity between the text feature of the text information labeled in the video sample and the video feature of each video segment is determined, and the video feature with the highest similarity is determined as the video feature matching the text feature of the text information labeled in the video sample.

(3) The video segment corresponding to the video feature matching the text feature of the text information labeled in the video sample is determined as the video segment matching the text information labeled in the video sample.

In this step, the start time and end time of the video feature matching the text feature of the text information labeled in the video sample are determined, and video content between the start time and the end time is determined as the video segment matching the text information labeled in the video sample.

In the embodiment of the present disclosure, based on the timing labeling network in the timing labeling model, feature extraction is performed on the video sample and the text information. Therefore, in the process of training the timing labeling network, through mutual constraint between the feature extraction network and the timing labeling network, two networks are trained in the same training process, thereby improving the efficiency of model training, improving the degree of adaptation of the timing labeling network and the feature extraction network, and further improving the accuracy of the timing labeling model.

In step 203, a timing labeling loss parameter of the timing labeling network to be trained is determined based on the video segment labeled by the timing labeling network to be trained and the video segment labeled in the video sample.

The timing labeling loss parameter is generated when the timing labeling model performs timing labeling on the video sample. The timing labeling loss parameter is generated based on a timing labeling loss function.

In some embodiments, the video feature of the video segment labeled by the timing labeling network and the video feature of the video segment labeled in the video sample are separately determined, the video feature of the video segment labeled by the timing labeling network and the video feature of the video segment labeled in the video sample are input into the timing labeling loss function, and the timing labeling loss parameter is determined by the timing labeling loss function based on the video features of the two video segments.

In some embodiments, the start time and end time of the video segment labeled by the timing labeling network are determined, and the start time and end time of the video segment labeled in the video sample are determined; based on the start times and end times of the two video segments, the timing labeling loss parameter is determined based on the timing labeling loss function. The process includes the following steps (4) to (6).

(4) The start time and end time of the video segment labeled by the timing labeling network in the video sample are determined.

In this step, the video segment labeled by the timing labeling network is determined, and the corresponding start time and end time of the video segment labeled by the timing labeling network in the video sample are determined.

In some embodiments, in the process of labeling the video segment based on the timing labeling network, the start time and end time of the video segment labeled by the timing labeling network are recorded. In this step, the start time and end time of the video segment labeled by the timing labeling network are directly called.

(5) The start time and end time of the video segment labeled in the video sample in the video sample are determined.

In some embodiments, the video segment labeled in the video sample is determined based on the start time and end time labeled in the video sample; that is, the start time and end time of the video segment are labeled in the video sample, and in this step, the start time and end time labeled in the video sample are directly acquired.

It should be noted that, in the embodiment of the present disclosure, the sequence of acquiring the start times and the end times of the two video segments is not specifically limited.

(6) The start time and end time of the video segment labeled by the timing labeling network in the video sample, and the start time and end time of the video segment labeled in the video sample in the video sample are input into the timing labeling loss function to acquire the timing labeling loss parameter. That is, the timing labeling loss parameter is determined based on the timing labeling loss function, the start time and end time of the video segment labeled by the timing labeling network in the video sample, and the start time and end time of the video segment labeled in the video sample in the video sample.

In this step, the start times and end times of the two video segments are used as variable values of the timing labeling loss function, and based on differences between the two start times and between the two end times; that is, the timing labeling loss parameter is determined based on the difference between the start time of the video segment labeled by the timing labeling network and the start time of the video segment labeled in the video sample, and the difference between the end time of the video segment labeled by the timing labeling network and the end time of the video segment labeled in the video sample.

In the embodiment of the present disclosure, a network parameter of the timing labeling network is adjusted by determining whether the start time of the video segment labeled by the timing labeling network matches the start time of the video segment labeled in the video sample, and determining whether the end time of the video segment labeled by the timing labeling network matches the end time of the video segment labeled in the video sample, thereby improving the training efficiency and accuracy of the model.

In step 204, a first similarity parameter between the video segment labeled by the timing labeling network to be trained and the text information labeled in the video sample and the video feature of the video segment labeled by the timing labeling network to be trained are determined based on the video segment labeled by the timing labeling network to be trained and the text information labeled in the video sample.

In the present embodiment of the present disclosure, based on the video segment labeled by the timing labeling network and the text information labeled in the video sample, the first similarity parameter and the video feature of the video segment labeled by the timing labeling network are determined.

The first similarity parameter is a similarity between the text feature of the text information labeled in the video sample and the video feature of the video segment labeled by the timing labeling network; that is, the first similarity parameter indicates the similarity between the video segment labeled by the timing labeling network and the text information labeled in the video sample. The first similarity parameter is determined according to any manner for determining a similarity. In some embodiments, the video feature of the video segment labeled by the timing labeling network and the text feature of the text information labeled in the video sample are both feature vectors, and the first similarity parameter is a similarity determined based on a cosine similarity algorithm. Correspondingly, the process includes the following steps (7) to (8).

(7) The video segment labeled by the timing labeling network and the text information labeled in the video sample are input into a feature extraction network to acquire the video feature of the video segment labeled by the timing labeling network and the text feature of the text information labeled in the video sample.

Based on the feature extraction network, the video feature of the video segment labeled by the timing labeling network and the text feature of the text information labeled in the video sample were extracted separately. In the embodiment of the present disclosure, the sequence of the process of extracting the video feature of the video segment labeled by the timing labeling network and the process of extracting the text of the text information labeled in the video sample is not limited.

(8) A cosine similarity between the video feature of the video segment labeled by the timing labeling network and the text feature of the text information labeled in the video sample is determined to acquire the first similarity parameter.

In this step, the cosine similarity between the video feature and the text feature is determined by the cosine similarity algorithm, and the acquired cosine similarity is determined as the first similarity parameter.

In the embodiment of the present disclosure, the video feature of the video segment labeled by the timing labeling network and the text feature of the text information labeled in the video sample are extracted based on the feature extraction network, and then the similarity of the two is acquired, such that in the process of performing model training on the timing labeling model, the feature extraction network and the timing labeling network can be subjected to model training at the same time, thereby improving the training efficiency and accuracy of the timing labeling model.

In the embodiment of the present disclosure, the video segment labeled by the timing labeling network and the text information labeled in the video sample are input into the feature extraction network, and the feature extraction network outputs the video feature of the video segment labeled by the timing labeling network and the first similarity parameter.

In step 205, a translation quality parameter of a visual text visual text translation network to be trained is determined based on the video feature of the video segment labeled by the timing labeling network to be trained and the text information labeled in the video sample.

The translation quality parameter represents a quality of translation from the video feature into the text information by the visual text translation network.

In some embodiments, the video feature of the video segment labeled by the timing labeling network is translated into text information describing the video segment labeled by the timing labeling network, the similarity between the translated text information and the text information labeled in the video sample is acquired, and the similarity is determined as the translation quality parameter of the visual text translation network. The higher the similarity is, the higher the translation quality parameter of the visual text translation network is; that is, the more accurate the text information translated by the visual text translation network is.

In this step, the video feature of the video segment labeled by the timing labeling network is input into the visual text translation network, the video feature is translated into the text information based on the visual text translation network, the translation quality parameter is acquired based on the translated text information, and the process includes the following steps (9) to (11).

(9) The video feature of the video segment labeled by the timing labeling network is input into the visual text translation network to acquire text information corresponding to the video sample.

In this step, based on the visual text translation network, the video feature is translated into the text information, and the text information for the translation of the video segment labeled by the timing labeling network is acquired.

(10) A second similarity parameter between the text information corresponding to the video sample and the text information labeled in the video sample is determined.

In some embodiments, text feature extraction is performed on the translated text information and the text information labeled in the video sample to acquire a text feature of the translated text information and the text feature of the text information labeled in the video sample, a similarity between the two text features is determined, and the similarity is taken as the second similarity parameter. The second similarity parameter is determined according to any manner for determining a similarity. For example, the similarity between the text features is determined based on a cosine similarity algorithm, and the similarity is determined as the second similarity parameter.

(11) The second similarity parameter is determined as the translation quality parameter.

In the embodiment of the present disclosure, since the translated text information and the text information labeled in the video sample both correspond to the video segment labeled by the timing labeling network, and the text information labeled in the video sample is pre-labeled and accurate, the second similarity parameter can indicate whether the translation of the video segment labeled by the timing labeling network by the text visual text translation network is accurate.

The video feature of the video segment labeled by the timing labeling network is translated by the visual text translation network, and based on the similarity between the translated text information and the text information labeled in the video sample, the visual text translation network and the timing labeling network can be subjected to model training at the same time in the process of performing model training on the timing labeling model, thereby improving the training efficiency and accuracy of the timing labeling model.

In step 206, the timing labeling model is acquired by performing parameter adjustment on the timing labeling model to be trained based on the timing labeling loss parameter, the first similarity parameter and the translation quality parameter.

In some embodiments, the feature extraction network and the visual text translation network in the timing labeling model are network models that have been trained, and then in this step, through the timing labeling loss parameter, the first similarity parameter and the translation quality parameter, the parameter of the timing labeling network is adjusted to acquire the timing labeling model.

In some embodiments, parameter adjustment is performed on the timing labeling network, the feature extraction network and the visual text translation network in the timing labeling model at the same time, the process is: network parameters of the timing labeling network, feature extraction network and visual text translation network to be trained are adjusted based on the timing labeling loss parameter, the first similarity parameter and the translation quality parameter, until the timing labeling loss parameter is less than a first threshold, the first similarity parameter is greater than a second threshold, and the translation quality parameter is greater than a third threshold, thereby completing the model training, and acquiring the timing labeling model.

The first threshold, the second threshold and the third threshold are set as required, and in the present embodiment of the present disclosure, the first threshold, the second threshold and the third threshold are not limited.

In the embodiment of the present disclosure, through multiple parameters, model training is performed on multiple networks in the timing labeling model at the same time. In the process of training the timing labeling model, different networks can be constrained to each other, such that multiple networks are trained in the same training process, thereby improving the training efficiency of the model and improving the degree of adaptability of each network in the timing labeling model.

It should be noted that the timing labeling network to be trained, the feature extraction network to be trained and the visual text translation network to be trained may be also subjected to model training separately, and then the trained timing labeling network, feature extraction network and visual text translation network can be directly constructed into the timing labeling model.

In the embodiment of the present disclosure, in the process of training the timing labeling model, parameters output by other networks are introduced, and the timing labeling model is subjected to model training based on the training parameters of multiple networks in the timing labeling model, thereby enriching the training parameters of the timing labeling model, and further improving the accuracy during video timing labeling of the timing labeling model.

The embodiment of the present disclosure provides a new timing labeling model, and the timing labeling model includes the timing labeling network, the feature extraction network, and the visual text translation network. In the process of processing the video file, the video segment matching the text information to be inquired in the video file can be recognized based on the timing labeling network. The text information corresponding to the video segment labeled in the video file is translated based on the visual text translation network, Therefore, the video segment matching the text information to be inquired and the text information corresponding to the video segment labeled in the video file can be output by the timing labeling model. That is, various output results of the video file are acquired based on one timing labeling model, thereby improving the diversity of a video labeling result.

Figure 4:
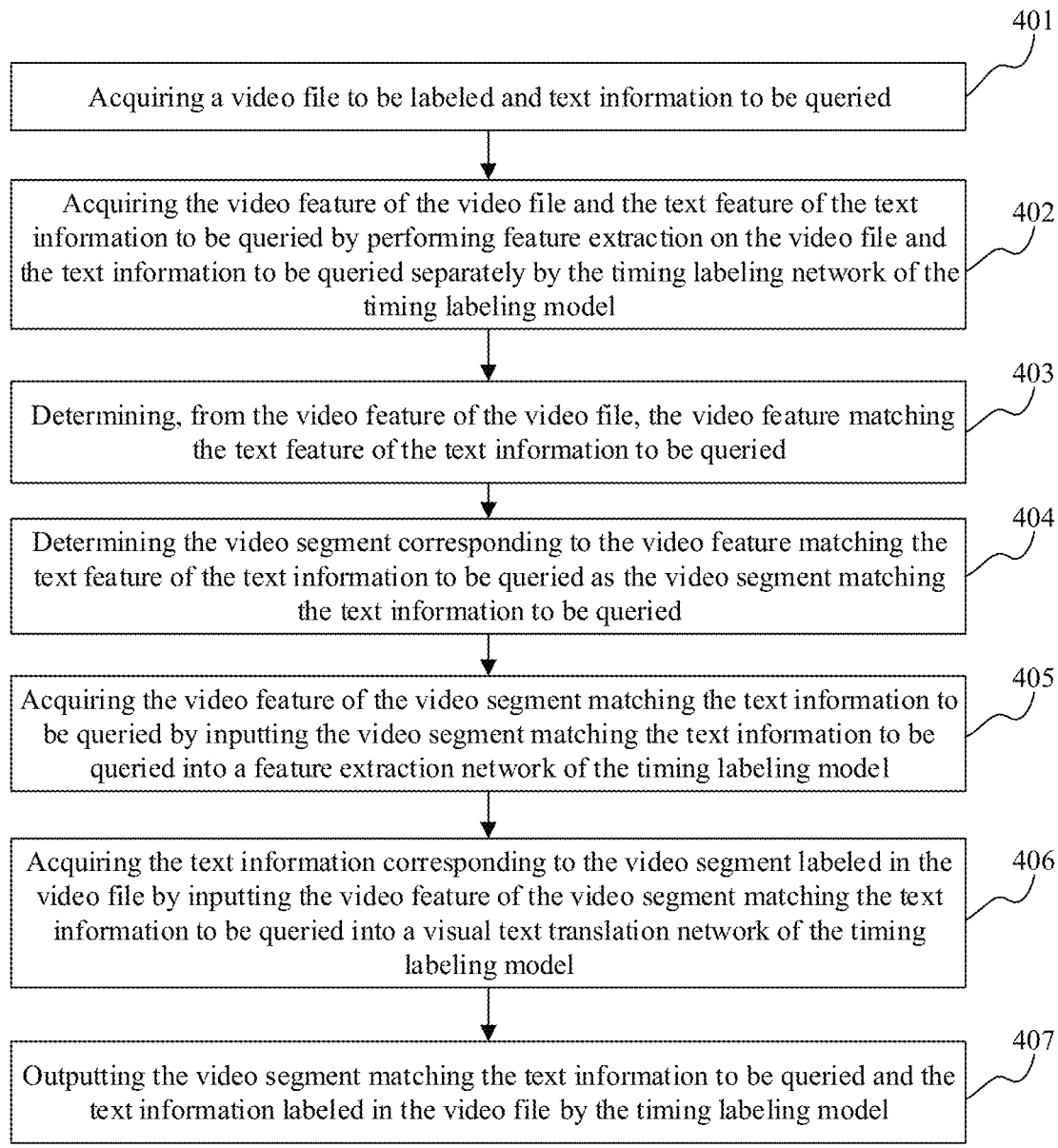
FIG. 4 is a flowchart of a video timing labeling method according to some embodiments.

After the model training is completed, the video file to be labeled may be subjected to timing labeling based on the trained timing labeling model. Referring to FIG. 4, FIG. 4 is a flowchart of a video timing labeling method according to some embodiments. In the embodiment of the present disclosure, the timing labeling of the video file by the timing labeling model is used as an example for description. As shown in FIG. 4, the method includes the following steps:

In step 401, a video file to be labeled and text information to be queried are acquired.

The text information to be queried is similar to the text information labeled in the video sample, and will not be repeated here.

The video file to be labeled is a video file uploaded by a user, or the video file is a video file in a database. In the present embodiment of the present disclosure, the video file is not specifically limited. For example, the video file is a video file that needs to be edited, the text information to be queried is the requirement of retaining video content during video editing, the video file input by the user, and the content requirement for editing the video file are received, and based on the content requirement, the video file is subjected to timing labeling. That is, in a video editing scenario, the text information to be inquired indicates the video segment that needs to be edited from the video file, the video text to be edited and the text information to be inquired are acquired, and then based on the text information to be inquired, the video file is subjected to timing labeling to acquire the video segment matching the text information to be inquired in the video file.

For another example, the video file is a video file in a query database, the text information to be queried input by the user is received, and the video file in the database is subjected to timing labeling based on the text information, thereby determining the video file matching the text information to be queried. That is, in a video query scenario, the text information to be inquired indicates a target video file to be queried, the text information to be inquired and multiple candidate video files in the database are acquired, then the timing labeling is performed on each candidate video file based on the text information to be inquired, and the candidate video file from which the video segment matching the text information to be inquired can be labeled is determined as the target video file.

In step 402, the video feature of the video file and the text feature of the text information to be queried are acquired by performing feature extraction on the video file and the text information to be queried separately by the timing labeling network of the timing labeling model.

This step is the same as step (1) in step 202 and is not be repeated here.

In step 403, the video feature matching the text feature of the text information to be queried is determined from the video feature of the video file. The video feature matching the text feature of the text information to be queried may be called the target video feature.

This step is the same as step (2) in step 202 and is not be repeated here.

In step 404, the video segment corresponding to the video feature matching the text feature of the text information to be queried is determined as the video segment matching the text information to be queried.

This step is the same as step (3) in step 202 and is not be repeated here.

In step 405, the video feature of the video segment matching the text information to be queried is acquired by inputting the video segment matching the text information to be queried into the feature extraction network of the timing labeling model.

This step is similar to the process of determining the video feature of the video segment labeled by the timing labeling network in step (7) in step 204 and is not be repeated here.

In step 406, the text information corresponding to the video segment labeled in the video file is acquired by inputting the video feature of the video segment matching the text information to be queried into the visual text translation network of the timing labeling model.

This step is the same as step (9) in step 205 and is not be repeated here.

In step 407, the video segment matching the text information to be inquired and the text information labeled in the video file are output by the timing labeling model.

Figure 5:
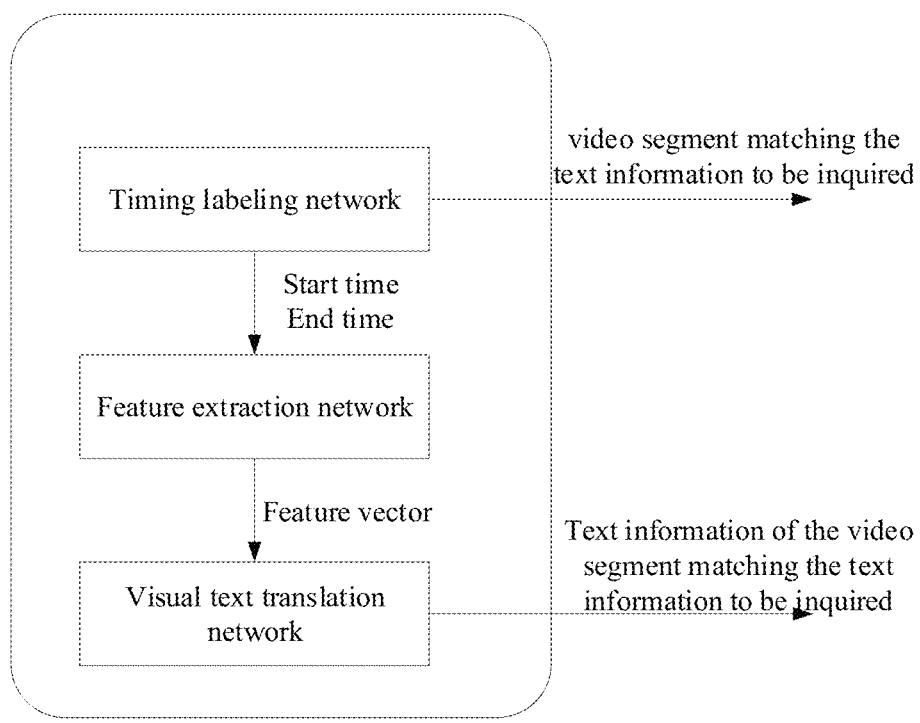
FIG. 5 is a flowchart of a video timing labeling method according to some embodiments.

In this step, referring to FIG. 5, the timing labeling model outputs the video segment matching the text information to be inquired and the text information corresponding to the video segment matching the text information to be inquired separately based on output results of multiple networks.

It should be noted that, in the foregoing embodiment, the text information to be inquired and the text information corresponding to the video segment matching the text information to be inquired are the same or different, which is not limited in the present embodiment of the present disclosure. For example, in the case that the target video is a video of a football game, and the text information to be inquired is "goal", then the video segment of "goal" in the target video and the text information corresponding to the video segment can be determined based on the timing labeling model. The text information is content describing a goal action in detail.

It should be noted that the timing labeling network, feature extraction network and visual text translation network in the timing labeling model may also be used independently. In the embodiment of the present disclosure, use modes of the networks in the timing labeling model are not specifically limited. For example, after the training is completed, the timing labeling network can be called separately to perform timing labeling on the video file. Alternatively, the feature extraction network is called to perform feature extraction on the video file or text file. Alternatively, the visual text translation network is called to translate the video feature, to acquire the text information corresponding to the video file.

The embodiment of the present disclosure provides a new timing labeling model, and the timing labeling model includes the timing labeling network, the feature extraction network, and the visual text translation network. In the process of processing the video file, the video segment matching, the text information to be inquired in the video file can be recognized based on the timing labeling network. The text information corresponding to the video segment labeled in the video file is translated based on the visual text translation network. Therefore, the video segment matching the text information to be inquired and the text information corresponding to the video segment labeled in the video file can be output by the timing labeling model. That is, various output results of the video file are acquired based on one timing labeling model, thereby improving the diversity of a video labeling result.

The video timing labeling method shown in the above embodiment may be applied in various scenarios.

For example, the method is applied in a video content search scenario.

An electronic device acquires a target video to be searched and a keyword "diving", and inputs the target video and "diving" into the timing labeling model, the timing labeling model labels a video segment related to "diving" in the target video, and then translates the video segment into corresponding description information, such that the video content related to "diving" in the target video is searched out.

For example, the method is applied to a video editing scenario.

The target video with a longer duration is stored in the electronic device, and in the case that the user needs to edit the desired video segment from the target video, the timing labeling model according to the embodiment of the present disclosure can be adopted. The target video and text description information corresponding to the video segment to be edited are input into the timing labeling model, the video segment matching the text description information and a keyword corresponding to the video segment are output based on the timing labeling model, and the output keyword is used as a title of the video segment. Therefore, the clipping of the target video is realized based on the timing labeling model.

Figure 6:
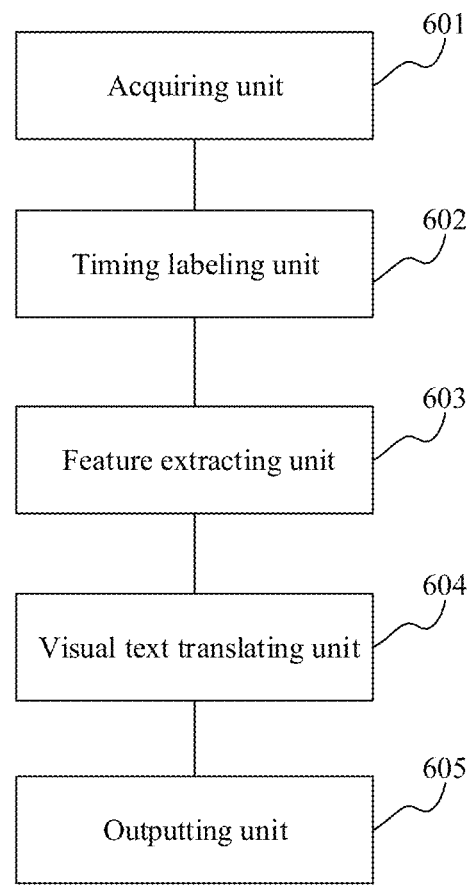
FIG. 6 is a block diagram of a video timing labeling apparatus according to some embodiments.

FIG. 6 is a block diagram of a video timing labeling apparatus according to some embodiments. Referring to FIG. 6, the apparatus includes:

an acquiring unit 601, configured to acquire a video file to be labeled and text information to be inquired;

a timing labeling unit 602, configured to acquire a video segment matching the text information to be inquired by inputting the video file and the text information to be inquired into a timing labeling network of a timing labeling model;

a feature extracting unit 603, configured to acquire a video feature of the video segment matching the text information to be inquired by inputting the video segment matching the text information to be inquired into a feature extraction network of the timing labeling model;

a visual text translating unit 604, configured to acquire text information corresponding to the video segment labeled in the video file by inputting the video feature of the video segment matching the text information to be inquired into a visual text translation network of the timing labeling model; and an outputting unit 605, configured to output the video segment matching the text information to be inquired and the text information corresponding to the video segment labeled in the video file based on the timing labeling model.

In some embodiments, the timing labeling unit 602 includes:

a feature extracting subunit, configured to acquire a video feature of the video file and a text feature of the text information to be inquired by performing feature extraction on the video file and the text information to be inquired based on the timing labeling network of the timing labeling model;

a first determining subunit, configured to determine, from the video feature of the video file, a video feature matching the text feature of the text information to be inquired; and a second determining subunit, configured to determine a video segment corresponding to the video feature matching the text feature of the text information to be inquired as the video segment matching the text information to be inquired.

In some embodiments, the apparatus further includes:

a first determining unit, configured to determine a timing labeling model to be trained, wherein the timing labeling model to be trained comprises a timing labeling network to be trained, a feature extraction network to be trained, and a visual text translation network to be trained;

the timing labeling unit 602, further configured to acquire a video segment labeled by the timing labeling network to be trained by inputting a video sample into the timing labeling network to be trained;

a second determining unit, configured to determine a timing labeling loss parameter of the timing labeling network to be trained based on the video segment labeled by the timing labeling network to be trained and a video segment labeled in the video sample;

a third determining unit, configured to determine a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample;

a fourth determining unit, configured to determine a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and a parameter adjusting unit, configured to adjust a parameter of the timing labeling model to be trained based on the timing labeling loss parameter, the first similarity parameter, and the translation quality parameter to acquire the timing labeling model.

In some embodiments, the second determining unit includes:

a third determining subunit, configured to determine start time and end time of the video segment labeled by the timing labeling network to be trained in the video sample, and start time and end time of the video segment labeled in the video sample in the video sample; and a loss parameter determining subunit, configured to determine the timing labeling loss parameter by inputting the start time and end time of the video segment labeled by the timing labeling network to be trained in the video sample and start time and end time of the video segment labeled in the video sample in the video sample into a timing labeling loss function.

In some embodiments, the third determining unit includes:

the feature extracting unit 603, configured to acquire the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and a first similarity determining subunit, configured to determine a cosine similarity between the video feature of the video segment labeled by the timing labeling network to be trained and the text feature of the text information labeled in the video sample as the first similarity parameter.

In some embodiments, the fourth determining unit includes:

the visual text translating unit 604, configured to acquire text information corresponding to the video sample by inputting the video feature of the video segment labeled by the timing labeling network to be trained into the visual text translation network to be trained;

a second similarity determining subunit, configured to determine a second similarity parameter between the text information corresponding to the video sample and the text information labeled in the video sample; and a fourth determining subunit, configured to determine the second similarity parameter as the translation quality parameter.

In some embodiments, the parameter adjusting unit is configured to adjust network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

Figure 7:
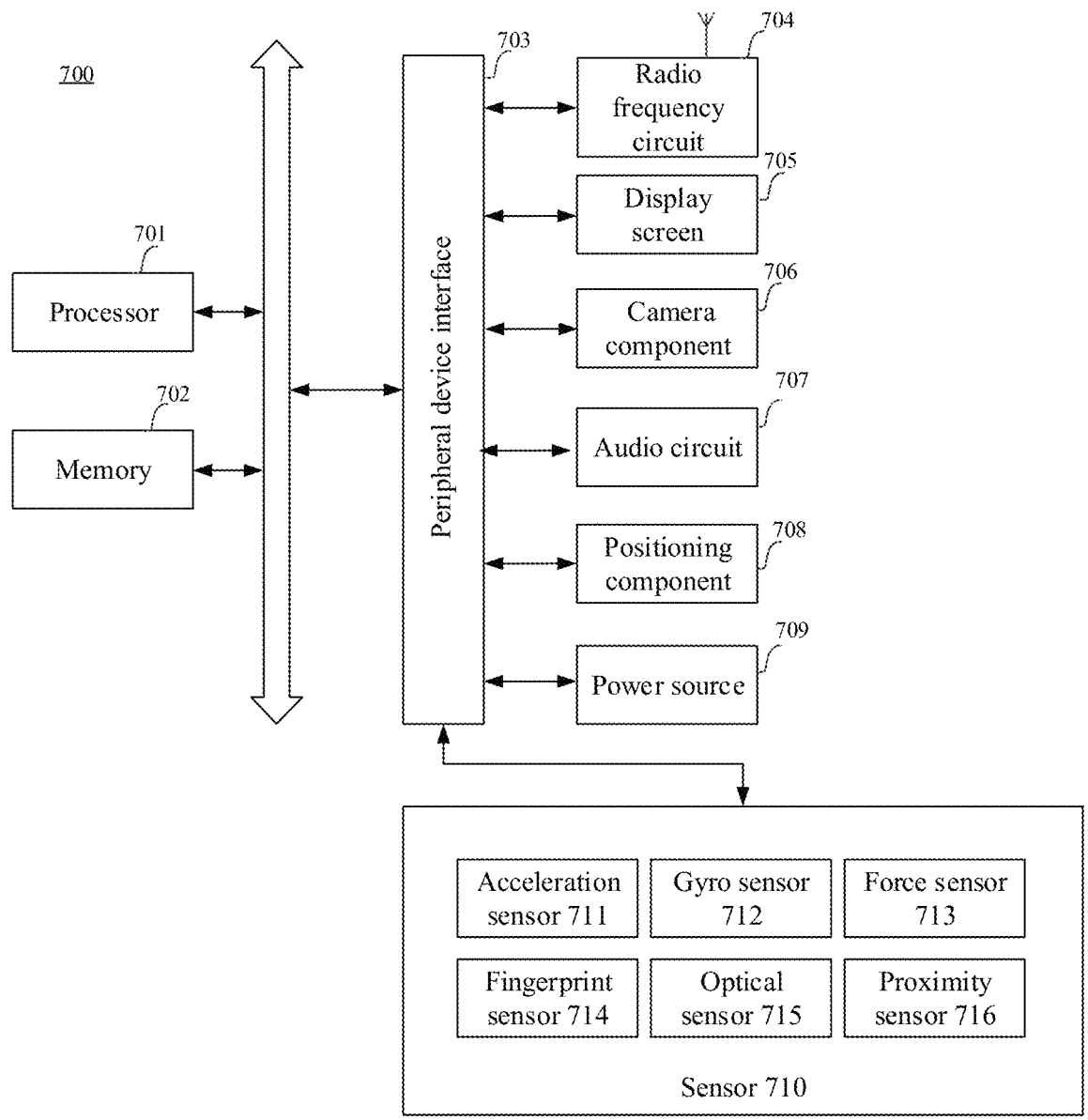
FIG. 7 is a schematic structural diagram of a terminal according to some embodiments.

The electronic device is a terminal or server. In some embodiments, the electronic device is a terminal for providing the video timing labeling method according to the present disclosure. FIG. 7 shows a structural block diagram of a terminal 700 in accordance with one exemplary embodiment of the present disclosure. In some embodiments, the terminal 700 is a portable mobile terminal, such as a smart phone, a tablet computer, a moving picture experts group audio layer III (MP3) player, a moving picture experts group audio layer IV (MP4) player, a laptop or desk computer. The terminal 700 may also be called user equipment (UE), a portable terminal, a laptop terminal, a desk terminal, etc.

Generally, the terminal 700 includes a processor 701 and a memory 702.

In some embodiments, the processor 701 includes one or more processing cores, such as a 4-core processor and an 8-core processor. In some embodiments, the processor 701 is formed by at least one hardware of a digital signal processing (DSP), a field-programmable gate array (FPGA), and a programmable logic array (PLA). In some embodiments, the processor 701 also includes a main processor and a coprocessor. The main processor is a processor for processing the data in an awake state, and is also called a central processing unit (CPU). The coprocessor is a low-power-consumption processor for processing the data in a standby state. In some embodiments, the processor 701 is integrated with a graphics processing unit (GPU), which is configured to render and draw the content that needs to be displayed by a display screen. In some embodiments, the processor 701 also includes an artificial intelligence (AI) processor configured to process computational operations related to machine learning.

In some embodiments, the memory 702 includes one or more computer-readable storage mediums, which can be non-transitory. The memory 702 also includes a high-speed random-access memory, as well as a non-volatile memory, such as one or more disk storage devices and flash storage devices. In some embodiments, the non-transitory computer-readable storage medium in the memory 702 is configured to store at least one instruction. The at least one instruction, when executed by the processor 701, causes the processor 701 to perform the video timing labeling method according to the method embodiments of the present disclosure.

In some embodiments, the terminal 700 also optionally includes a peripheral device interface 703 and at least one peripheral device. In some embodiments, the processor 701, the memory 702, and the peripheral device interface 703 are connected by a bus or a signal line. Each peripheral device is connected to the peripheral device interface 703 by a bus, a signal line or a circuit board. Optionally, the peripheral device includes at least one of a radio frequency circuit 704, a touch display screen 705, a camera component 706, an audio circuit 707, a positioning component 708 and a power source 709.

The peripheral device interface 703 may be configured to connect at least one peripheral device associated with an input/output (I/O) to the processor 701 and the memory 702. In some embodiments, the processor 701, the memory 702 and the peripheral device interface 703 are integrated on the same chip or circuit board. In some other embodiments, any one or two of the processor 701, the memory 702 and the peripheral device interface 703 is/are implemented on a separate chip or circuit board, which is not limited in the present embodiment.

The radio frequency circuit 704 is configured to receive and transmit a radio frequency (RF) signal, which is also referred to as an electromagnetic signal. The radio frequency circuit 704 communicates with a communication network and other communication devices via the electromagnetic signal. The radio frequency circuit 704 converts the electrical signal into the electromagnetic signal for transmission, or converts the received electromagnetic signal into the electrical signal. Optionally, the radio frequency circuit 704 includes an antenna system, an RF transceiver, one or more amplifiers, a tuner, an oscillator, a digital signal processor, a codec chipset, a subscriber identity module card, and the like. In some embodiments, the radio frequency circuit 704 communicates with other terminals via at least one wireless communication protocol. The wireless communication protocol includes, but not limited to, the World Wide Web (WWW), a metropolitan area network (WAN), an intranet, various generations of mobile communication networks (2G, 3G, 4G, and 5G), a wireless local area network (LAN), and/or a wireless fidelity (Wi-Fi) network. In some embodiments, the RF circuit 704 also includes near-field communication (NFC) related circuits, which is not limited in the present disclosure.

The display screen 705 is configured to display a user interface (UI). In some embodiments, the UI includes graphics, text, icons, videos, and any combination thereof. When the display screen 705 is a touch display screen, the display screen 705 also has the capacity to acquire touch signals on or over the surface of the display screen 705. In some embodiments, the touch signal may be input into the processor 701 as a control signal for processing. At this time, the display screen 705 is also configured to provide virtual buttons and/or virtual keyboards, which are also referred to as soft buttons and/or soft keyboards. In some embodiments, one display screen 705 is disposed on the front panel of the terminal 700. In some other embodiments, at least two display screens 705 are disposed respectively on different surfaces of the terminal 700 or in a folded design. In further embodiments, the display screen 705 is a flexible display screen disposed on the curved or folded surface of the terminal 700. Even the display screen 705 has an irregular shape other than a rectangle; that is, the display screen 705 is an irregular-shaped screen. In some embodiments, the display screen 705 may be a liquid crystal display (LCD) screen, an organic light-emitting diode (OLED) screen or the like.

The camera component 706 is configured to capture images or videos. Optionally, the camera component 706 includes a front camera and a rear camera. Usually, the front camera is placed on the front panel of the terminal, and the rear camera is placed on the back of the terminal. In some embodiments, at least two rear cameras are disposed, and are at least one of a main camera, a depth-of-field camera, a wide-angle camera, and a telephoto camera respectively, so as to realize a background blurring function achieved by fusion of the main camera and the depth-of-field camera, panoramic shooting and virtual reality (VR) shooting functions achieved by fusion of the main camera and the wide-angle camera or other fusion shooting functions. In some embodiments, the camera component 706 also includes a flashlight. The flashlight is a mono-color temperature flashlight or a two-color temperature flashlight. The two-color temperature flash is a combination of a warm flashlight and a cold flashlight and used for light compensation at different color temperatures.

In some embodiments, the audio circuit 707 includes a microphone and a speaker. The microphone is configured to collect sound waves of users and environments, and convert the sound waves into electrical signals which are input into the processor 701 for processing, or input into the RF circuit 704 for voice communication. In some embodiments, for the purpose of stereo acquisition or noise reduction, there are a plurality of microphones respectively disposed at different locations of the terminal 700. In some embodiments, the microphone is also an array microphone or an omnidirectional acquisition microphone. The speaker is then configured to convert the electrical signals from the processor 701 or the radio frequency circuit 704 into the sound waves. In some embodiments, the speaker may be a conventional film speaker or a piezoelectric ceramic speaker. When the speaker is the piezoelectric ceramic speaker, the electrical signal can be converted into not only human-audible sound waves but also the sound waves which are inaudible to humans for the purpose of ranging and the like. In some embodiments, the audio circuit 707 also includes a headphone jack.

The positioning component 708 is configured to locate the current geographic location of the terminal 700 to implement navigation or location-based service (LBS). In some embodiments, the positioning component 708 may be the United States' Global Positioning System (GPS), Russia's Global Navigation Satellite System (GLONASS), and China's BeiDou Navigation Satellite System (BDS).

The power source 709 is configured to power up various components in the terminal 700. In some embodiments, the power source 709 is alternating current, direct current, a disposable battery, or a rechargeable battery. When the power source 709 includes the rechargeable battery, the rechargeable battery is a wired rechargeable battery or a wireless rechargeable battery. The wired rechargeable battery is a battery charged by a cable line, and wireless rechargeable battery is charged by a wireless coil. The rechargeable battery also supports the fast charging technology.

In some embodiments, terminal 700 also includes one or more sensors 710. The one or more sensors 710 include, but not limited to, an acceleration sensor 711, a gyro sensor 712, a force sensor 713, a fingerprint sensor 714, an optical sensor 715 and a proximity sensor 716.

In some embodiments, the acceleration sensor 711 detects magnitudes of accelerations on three coordinate axes of a coordinate system established by the terminal 700. For example, the acceleration sensor 711 is configured to detect components of a gravitational acceleration on the three coordinate axes. In some embodiments, the processor 701 may control the touch display screen 705 to display a user interface in a landscape view or a portrait view according to a gravity acceleration signal collected by the acceleration sensor 711. The acceleration sensor 711 is also configured to collect motion data of a game or a user.

In some embodiments, the gyro sensor 712 detects a body direction and a rotation angle of the terminal 700, and cooperates with the acceleration sensor 711 to collect a 3D motion of the user on the terminal 700. Based on the data collected by the gyro sensor 712, the processor 701 can serve the following functions: motion sensing (such as changing the UI according to a user's tilt operation), image stabilization during shooting, game control and inertial navigation.

In some embodiments, the force sensor 713 is disposed on a side frame of the terminal 700 and/or a lower layer of the touch display screen 705. When the force sensor 713 is disposed on the side frame of the terminal 700, a user's holding signal to the terminal 700 can be detected. The processor 701 performs left-right hand recognition or quick operation according to the holding signal collected by the force sensor 713. When the force sensor 713 is disposed on the lower layer of the touch display screen 705, the processor 701 controls an operable control on the UI according to a user's press operation on the touch display screen 705. The operable control includes at least one of a button control, a scroll bar control, an icon control and a menu control.

The fingerprint sensor 714 is configured to collect a user's fingerprint. The processor 701 identifies the user's identity based on the fingerprint collected by the fingerprint sensor 714, or the fingerprint sensor 714 identifies the user's identity based on the collected fingerprint. When the user's identity is identified as trusted, the processor 701 authorizes the user to perform related sensitive operations, such as unlocking the screen, viewing encrypted information, downloading software, paying, and changing settings. In some embodiments, the fingerprint sensor 714 is disposed on the front, back, or side of the terminal 700. In some embodiments, when the terminal 700 is provided with a physical button or a manufacturer's Logo, the fingerprint sensor 714 is integrated with the physical button or the manufacturer's Logo.

The optical sensor 715 is configured to collect ambient light intensity. In one embodiment, the processor 701 controls the display brightness of the touch display screen 705 according to the ambient light intensity collected by the optical sensor 715. For example, when the ambient light intensity is high, the display brightness of the touch display screen 705 is increased; and when the ambient light intensity is low, the display brightness of the touch display screen 705 is decreased. In another embodiment, the processor 701 also dynamically adjusts shooting parameters of the camera component 706 according to the ambient light intensity collected by the optical sensor 715.

The proximity sensor 716, also referred to as a distance sensor, is usually disposed on the front panel of the terminal 700. The proximity sensor 716 is configured to capture a distance between the user and a front surface of the terminal 700. In one embodiment, when the proximity sensor 716 detects that the distance between the user and the front surface of the terminal 700 becomes gradually smaller, the processor 701 controls the touch display screen 705 to switch from a screen-on state to a screen-off state. When it is detected that the distance between the user and the front surface of the terminal 700 gradually increases, the processor 701 controls the touch display screen 705 to switch from the screen-off state to the screen-on state.

It will be understood by those skilled in the art that the structure shown in FIG. 7 does not constitute a limitation to the terminal 700, and may include more or less components than those illustrated, or combine some components or adopt different component arrangements.

Figure 8:
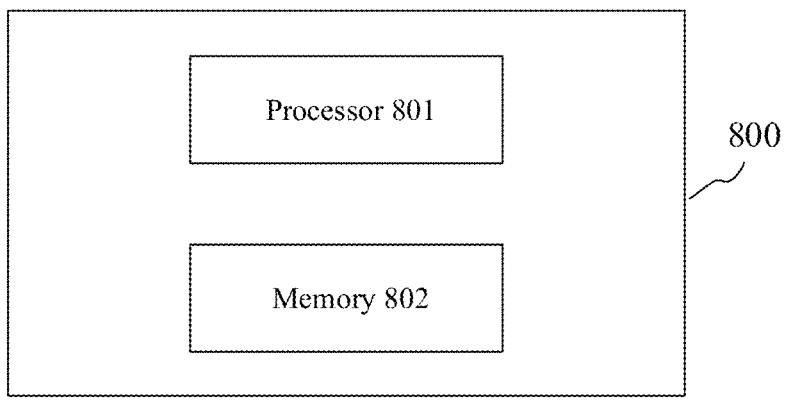
FIG. 8 is a schematic structural diagram of a server according to some embodiments.

In some embodiments, the electronic device is a server for providing the video timing labeling method according to the present disclosure. FIG. 8 shows a structural block diagram of a server 800 according to an exemplary embodiment of the present disclosure. In some embodiments, the server 800 may vary greatly due to different configurations or performances, including one or more central processing units (CPUs) 801 and one or more memories 802, wherein the memory 801 stores at least one instruction, and the at least one instruction is loaded and executed by the processor 801 to implement the method for retrieving a target object according to above respective method embodiments. Of course, in some embodiments, the server 800 also has the components such as a wired or wireless network interface, a keyboard, and an input and output interface for input and output, and the server 800 also includes other components for realizing device functions, which is not repeated here.

The embodiment of the present disclosure also provides an electronic device including: one or more processors; and a memory configured to store one or more instructions executable by the one or more processors; wherein the one or more processors, when loading and executing the one or more instructions, are caused to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

In some embodiments, the one or more processors, when loading and executing the one or more instructions, are caused to perform: acquiring a video feature of the video file and a text feature of the text information to be inquired by performing feature extraction on the video file and the text information to be inquired based on the timing labeling network of the timing labeling model; determining, from the video feature of the video file, a video feature matching the text feature of the text information to be inquired; and determining a video segment corresponding to the video feature matching the text feature of the text information to be inquired as the video segment matching the text information to be inquired.

In some embodiments, the one or more processors, when loading and executing the one or more instructions, are caused to perform: determining a timing labeling model to be trained, wherein the timing labeling model to be trained comprises a timing labeling network to be trained, a feature extraction network to be trained, and a visual text translation network to be trained; acquiring a video segment labeled by the timing labeling network to be trained by inputting a video sample into the timing labeling network to be trained; determining a timing labeling loss parameter of the timing labeling network to be trained based on the video segment labeled by the timing labeling network to be trained and a video segment labeled in the video sample; determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample; determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

In some embodiments, the one or more processors, when loading and executing the one or more instructions, are caused to perform: determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

In some embodiments, the one or more processors, when loading and executing the one or more instructions, are caused to perform: acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

In some embodiments, the one or more processors, when loading and executing the one or more instructions, are caused to perform: acquiring text information corresponding to the video sample by inputting the video feature of the video segment labeled by the timing labeling network to be trained into the visual text translation network to be trained; determining a second similarity parameter between the text information corresponding to the video sample and the text information labeled in the video sample; and determining the second similarity parameter as the translation quality parameter.

In some embodiments, the one or more processors, when loading and executing the one or more instructions, are caused to perform: adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

The embodiment of the present disclosure also provides a non-transitory computer-readable storage medium storing one or more instructions therein, wherein the one or more instructions, when loaded and executed by a processor of an electronic device, cause the electronic device to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

In some embodiments, the one or more instructions in the computer-readable storage medium, when loaded and executed by the processor of the electronic device, cause the electronic device to perform: acquiring a video feature of the video file and a text feature of the text information to be inquired by performing feature extraction on the video file and the text information to be inquired based on the timing labeling network of the timing labeling model; determining, from the video feature of the video file, a video feature matching the text feature of the text information to be inquired; and determining a video segment corresponding to the video feature matching the text feature of the text information to be inquired as the video segment matching the text information to be inquired.

In some embodiments, the one or more instructions in the computer-readable storage medium, when loading and executed by the processor of the electronic device, cause the electronic device to perform: determining a timing labeling model to be trained, wherein the timing labeling model to be trained comprises a timing labeling network to be trained, a feature extraction network to be trained, and a visual text translation network to be trained; acquiring a video segment labeled by the timing labeling network to be trained by inputting a video sample into the timing labeling network to be trained; determining a timing labeling loss parameter of the timing labeling network to be trained based on the video segment labeled by the timing labeling network to be trained and a video segment labeled in the video sample; determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample; determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

In some embodiments, the one or more instructions in the computer-readable storage medium, when loaded and executed by the processor of the electronic device, cause the electronic device to perform: determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

In some embodiments, the one or more instructions in the computer-readable storage medium, when loaded and executed by the processor of the electronic device, cause the electronic device to perform: acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

In some embodiments, the one or more instructions in the computer-readable storage medium, when loaded and executed by the processor of the electronic device, cause the electronic device to perform: acquiring text information corresponding to the video sample by inputting the video feature of the video segment labeled by the timing labeling network to be trained into the visual text translation network to be trained; determining a second similarity parameter between the text information corresponding to the video sample and the text information labeled in the video sample; and determining the second similarity parameter as the translation quality parameter.

In some embodiments, the one or more instructions in the computer-readable storage medium, when loaded and executed by the processor of the electronic device, cause the electronic device to perform: adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

The embodiment of the present disclosure also provides a computer program product including computer instructions, wherein the one or more computer instructions, when executed by a processor, cause the processor to perform: acquiring a video file to be labeled and text information to be inquired; acquiring a video segment matching the text information to be inquired by inputting the video file and the text information to be inquired into a timing labeling network of a timing labeling model; acquiring a video feature of the video segment matching the text information to be inquired by inputting the video segment matching the text information to be inquired into a feature extraction network of the timing labeling model; acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

In some embodiments, the computer instructions, when executed by the processor, cause the processor to perform: acquiring a video feature of the video file and a text feature of the text information to be inquired by performing feature extraction on the video file and the text information to be inquired based on the timing labeling network of the timing labeling model; determining, from the video feature of the video file, a video feature matching the text feature of the text information to be inquired; and determining a video segment corresponding to the video feature matching the text feature of the text information to be inquired as the video segment matching the text information to be inquired.

In some embodiments, the computer instructions, when executed by the processor, cause the processor to perform: determining a timing labeling model to be trained, wherein the timing labeling model to be trained comprises a timing labeling network to be trained, a feature extraction network to be trained, and a visual text translation network to be trained; acquiring a video segment labeled by the timing labeling network to be trained by inputting a video sample into the timing labeling network to be trained; determining a timing labeling loss parameter of the timing labeling network to be trained based on the video segment labeled by the timing labeling network to be trained and a video segment labeled in the video sample; determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample; determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

In some embodiments, the computer instructions, when executed by the processor, cause the processor to perform: determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

In some embodiments, the computer instructions, when executed by the processor, cause the processor to perform: acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

In some embodiments, the computer instructions, when executed by the processor, cause the processor to perform: acquiring text information corresponding to the video sample by inputting the video feature of the video segment labeled by the timing labeling network to be trained into the visual text translation network to be trained; determining a second similarity parameter between the text information corresponding to the video sample and the text information labeled in the video sample; and determining the second similarity parameter as the translation quality parameter.

In some embodiments, the computer instructions, when executed by the processor, cause the processor to perform: adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

All the embodiments of the present disclosure may be implemented individually or in combination with other embodiments, which are all regarded as the protection scope required by the present disclosure.

What is claimed is:

1. A video timing labeling method, comprising:
acquiring a video file to be labeled and text information to be inquired;
acquiring a video segment matching the text information to be inquired by inputting the video file and the text information to be inquired into a timing labeling network of a timing labeling model;
acquiring a video feature of the video segment matching the text information to be inquired by inputting the video segment matching the text information to be inquired into a feature extraction network of the timing labeling model;
acquiring text information corresponding to the video segment labeled in the video file by inputting the video feature of the video segment matching the text information to be inquired into a visual text translation network of the timing labeling model; and
outputting the video segment matching the text information to be inquired and the text information corresponding to the video segment labeled in the video file based on the timing labeling model.

2. The method according to claim 1, wherein said acquiring the video segment matching the text information to be inquired by inputting the video file and the text information to be inquired into the timing labeling network of the timing labeling model comprises:
acquiring the video feature of the video file and a text feature of the text information to be inquired by performing feature extraction on the video file and the text information to be inquired based on the timing labeling network of the timing labeling model;
determining, from the video feature of the video file, a target video feature matching the text feature of the text information to be inquired; and
determining a video segment corresponding to the target video feature matching the text feature of the text information to be inquired as the video segment matching the text information to be inquired.

3. The method according to claim 1, wherein the timing labeling model is obtained by:
determining a timing labeling model to be trained, wherein the timing labeling model to be trained comprises a timing labeling network to be trained, a feature extraction network to be trained, and a visual text translation network to be trained;
acquiring a video segment labeled by the timing labeling network to be trained by inputting a video sample into the timing labeling network to be trained;
determining a timing labeling loss parameter of the timing labeling network to be trained based on the video segment labeled by the timing labeling network to be trained and a video segment labeled in the video sample;
determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample;
determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and
adjusting a parameter of the timing labeling model to be trained based on the timing labeling loss parameter, the first similarity parameter, and the translation quality parameter to acquire the timing labeling model.

4. The method according to claim 3, wherein said determining the timing labeling loss parameter of the timing labeling network to be trained based on the video segment labeled by the timing labeling network to be trained and the video segment labeled in the video sample comprises:
determining start time and end time of the video segment labeled by the timing labeling network to be trained in the video sample, and start time and end time of the video segment labeled in the video sample in the video sample; and
determining the timing labeling loss parameter by inputting the start time and end time of the video segment labeled by the timing labeling network to be trained in the video sample and start time and end time of the video segment labeled in the video sample in the video sample into a timing labeling loss function.

5. The method according to claim 3 wherein said determining the first similarity parameter and the video feature of the video segment labeled by the timing labeling network to be trained based on the video segment labeled by the timing labeling network to be trained and the text information labeled in the video sample comprises:
acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and
determining a cosine similarity between the video feature of the video segment labeled by the timing labeling network to be trained and the text feature of the text information labeled in the video sample as the first similarity parameter.

6. The method according to claim 3, wherein said determining the translation quality parameter of the visual text translation network to be trained based on the video feature of the video segment labeled by the timing labeling network to be trained and the text information labeled in the video sample comprises:
acquiring text information corresponding to the video sample by inputting the video feature of the video segment labeled by the timing labeling network to be trained into the visual text translation network to be trained;
determining a second similarity parameter between the text information corresponding to the video sample and the text information labeled in the video sample; and determining the second similarity parameter as the translation quality parameter.

7. The method according to claim 3, wherein said adjusting the parameter of the timing labeling model to be trained based on the timing labeling loss parameter, the first similarity parameter, and the translation quality parameter to acquire the timing labeling model comprises:

adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

8. An electronic device comprising:

one or more processors; and a memory configured to store one or more instructions executable by the one or more processors;

wherein the one or more processors, when loading and executing the one or more instructions, are caused to perform:

acquiring a video file to be labeled and text information to be inquired;

acquiring a video segment matching the text information to be inquired by inputting the video file and the text information to be inquired into a timing labeling network of a timing labeling model;

acquiring a video feature of the video segment matching the text information to be inquired by inputting the video segment matching the text information to be inquired into a feature extraction network of the timing labeling model;

acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

9. The electronic device according to claim 8, wherein the one or more processors, when loading and executing the one or more instructions, are caused to perform:

acquiring the video feature of the video file and a text feature of the text information to be inquired by performing feature extraction on the video file and the text information to be inquired based on the timing labeling network of the timing labeling model;

determining, from the video feature of the video file, a target video feature matching the text feature of the text information to be inquired; and determining a video segment corresponding to the target video feature matching the text feature of the text information to be inquired as the video segment matching the text information to be inquired.

10. The electronic device according to claim 8, wherein the one or more processors, when loading and executing the one or more instructions, are caused to perform:

determining a timing labeling model to be trained, wherein the timing labeling model to be trained comprises a timing labeling network to be trained, a feature extraction network to be trained, and a visual text translation network to be trained;

acquiring a video segment labeled by the timing labeling network to be trained by inputting a video sample into the timing labeling network to be trained;

determining a timing labeling loss parameter of the timing labeling network to be trained based on the video segment labeled by the timing labeling network to be trained and a video segment labeled in the video sample;

determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample;

determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

11. The electronic device according to claim 10, wherein the one or more processors, when loading and executing the one or more instructions, are caused to perform:

determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

12. The electronic device according to claim 10, wherein the one or more processors, when loading and executing the one or more instructions, are caused to perform:

acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

13. The electronic device according to claim 10, wherein the one or more processors, when loading and executing the one or more instructions, are caused to perform:

acquiring text information corresponding to the video sample by inputting the video feature of the video segment labeled by the timing labeling network to be trained into the visual text translation network to be trained;

determining a second similarity parameter between the text information corresponding to the video sample and the text information labeled in the video sample; and determining the second similarity parameter as the translation quality parameter.

14. The electronic device according to claim 10 wherein the one or more processors, when loading and executing the one or more instructions, are caused to perform:

adjusting network parameters of the timing labeling network to be trained, the feature extraction network to be trained, and the visual text translation network to be trained based on the timing labeling loss parameter, the first similarity parameter, and the translation quality parameter until the timing labeling loss parameter is less than a first preset threshold, the first similarity parameter is greater than a second preset threshold, and the translation quality parameter is greater than a third preset threshold, so as to complete model training and acquire the timing labeling model.

15. A non-transitory computer-readable storage medium storing one or more instructions therein, wherein the one or more instructions, when loaded and executed by a processor of an electronic device, cause the electronic device to perform:

acquiring a video file to be labeled and text information to be inquired;

acquiring a video segment matching the text information to be inquired by inputting the video file and the text information to be inquired into a timing labeling network of a timing labeling model;

acquiring a video feature of the video segment matching the text information to be inquired by inputting the video segment matching the text information to be inquired into a feature extraction network of the timing labeling model;

acquiring text information corresponding to the video segment labeled in the video file by inputting the video feature of the video segment matching the text information to be inquired into a visual text translation network of the timing labeling model; and outputting the video segment matching the text information to be inquired and the text information corresponding to the video segment labeled in the video file based on the timing labeling model.

16. The non-transitory computer-readable storage medium according to claim 15, wherein the one or more instructions, when loaded and executed by the processor of the electronic device, cause the electronic device to perform:

acquiring the video feature of the video file and a text feature of the text information to be inquired by performing feature extraction on the video file and the text information to be inquired based on the timing labeling network of the timing labeling model;

determining, from the video feature of the video file, a target video feature matching the text feature of the text information to be inquired; and determining a video segment corresponding to the target video feature matching the text feature of the text information to be inquired as the video segment matching the text information to be inquired.

17. The non-transitory computer-readable storage medium according to claim 15, wherein the one or more instructions, when loaded and executed by the processor of the electronic device, cause the electronic device to perform:

determining a timing labeling model to be trained, wherein the timing labeling model to be trained comprises a timing labeling network to be trained, a feature extraction network to be trained, and a visual text translation network to be trained;

acquiring a video segment labeled by the timing labeling network to be trained by inputting a video sample into the timing labeling network to be trained;

determining a timing labeling loss parameter of the timing labeling network to be trained based on the video segment labeled by the timing labeling network to be trained and a video segment labeled in the video sample;

determining a first similarity parameter and a video feature of the video segment labeled by the timing labeling network to be trained based on the video segment labeled by the timing labeling network to be trained and text information labeled in the video sample, wherein the first similarity parameter indicates a similarity between the video segment labeled by the timing labeling network to be trained and the text information labeled in the video sample;

determining a translation quality parameter of the visual text translation network to be trained based on the video feature of the video segment labeled by the timing labeling network to be trained and the text information labeled in the video sample, wherein the translation quality parameter represents a quality of translation from the video feature into the text information by the visual text translation network; and adjusting a parameter of the timing labeling model to be trained based on the timing labeling loss parameter, the first similarity parameter, and the translation quality parameter to acquire the timing labeling model.

18. The non-transitory computer-readable storage medium according to claim 17, wherein the one or more instructions, when loaded and executed by the processor of the electronic device, cause the electronic device to perform:

determining start time and end time of the video segment labeled by the timing labeling network to be trained in the video sample, and start time and end time of the video segment labeled in the video sample in the video sample; and determining the timing labeling loss parameter by inputting the start time and end time of the video segment labeled by the timing labeling network to be trained in the video sample and start time and end time of the video segment labeled in the video sample in the video sample into a timing labeling loss function.

19. The non-transitory computer-readable storage medium according to claim 17, wherein the one or more instructions, when loaded and executed by the processor of the electronic device, cause the electronic device to perform:

acquiring the video feature of the video segment labeled by the timing labeling network to be trained and a text feature of the text information labeled in the video sample by inputting the video segment labeled by the timing labeling network to be trained and the text information labeled in the video sample into the feature extraction network to be trained; and determining a cosine similarity between the video feature of the video segment labeled by the timing labeling network to be trained and the text feature of the text information labeled in the video sample as the first similarity parameter.

20. The non-transitory computer-readable storage medium according to claim 17, wherein the one or more instructions, when loaded and executed by the processor of the electronic device, cause the electronic device to perform:
- acquiring text information corresponding to the video sample by inputting the video feature of the video segment labeled by the timing labeling network to be trained into the visual text translation network to be trained;
- determining a second similarity parameter between the text information corresponding to the video sample and the text information labeled in the video sample; and
- determining the second similarity parameter as the translation quality parameter.

* * * * *